(12) United States Patent
Alingh

(10) Patent No.: US 8,938,928 B2
(45) Date of Patent: Jan. 27, 2015

(54) ROOFING BATTEN SNAP SPACER

(71) Applicant: Stoneworth Building Products, Shawnee, KS (US)

(72) Inventor: Andrew Alingh, Leawood, KS (US)

(73) Assignee: Stoneworth Building Products, Shawnee, KS (US)

( * ) Notice: Subject to any disclaimer, the term of this patent is extended or adjusted under 35 U.S.C. 154(b) by 0 days.

(21) Appl. No.: 13/843,660

(22) Filed: Mar. 15, 2013

(65) Prior Publication Data

US 2014/0260049 A1  Sep. 18, 2014

(51) Int. Cl.
*E04D 1/34* (2006.01)
*E04D 12/00* (2006.01)
*B32B 11/02* (2006.01)

(52) U.S. Cl.
CPC .............. *E04D 12/006* (2013.01); *B32B 11/02* (2013.01)
USPC ......... 52/553; 52/715; 52/489.2; 248/222.12; 248/346.04

(58) Field of Classification Search
CPC .................................................... E04D 12/006
USPC ............. 52/553, 549, 677, 715, 489.1, 489.2; 248/604, 237, 222.11, 222.12, 313, 248/346.04
See application file for complete search history.

(56) References Cited

U.S. PATENT DOCUMENTS

| | | | | |
|---|---|---|---|---|
| 1,400,564 A * | 12/1921 | Metzger | ........................ | 248/473 |
| 2,862,255 A * | 12/1958 | Nelson | ......................... | 52/403.1 |
| 3,975,880 A * | 8/1976 | Fischer, Jr. | ...................... | 52/464 |
| 4,119,285 A * | 10/1978 | Bisping et al. | ................... | 248/72 |
| 4,271,651 A * | 6/1981 | Sorrells, Jr. | ...................... | 52/460 |
| 4,288,951 A * | 9/1981 | Carlson et al. | .................... | 52/94 |
| 5,479,752 A * | 1/1996 | Menegoli | ........................ | 52/549 |
| 5,644,878 A * | 7/1997 | Wehrmann | .................... | 52/287.1 |
| 6,101,777 A * | 8/2000 | Bodine et al. | ............... | 52/506.06 |
| 6,202,382 B1 * | 3/2001 | Conterno | ........................ | 52/762 |
| 6,339,908 B1 * | 1/2002 | Chuang | ......................... | 52/589.1 |
| 6,357,193 B1 | 3/2002 | Morris | | |
| 6,375,494 B2 * | 4/2002 | Renmark et al. | .............. | 439/500 |

(Continued)

FOREIGN PATENT DOCUMENTS

| | | | | |
|---|---|---|---|---|
| DE | 3209348 A1 * | 9/1983 | .............. | E04D 13/16 |
| GB | 2176219 A * | 12/1986 | .............. | E04D 13/16 |
| GB | 2402405 A * | 12/2004 | ............ | E04F 15/024 |

OTHER PUBLICATIONS

Tile Roofing Institute/WSRCA, pp. 12, 21, 22, Jan. 2000, revised Mar. 2010.

*Primary Examiner* — Brent W Herring
(74) *Attorney, Agent, or Firm* — ARC IP Law, PC; Joseph J. Mayo

(57) ABSTRACT

At least one embodiment of the invention describes roofing batten snap spacers that elevate a roofing batten from a roof. In one or more embodiments, the roofing batten snap spacer includes a base element having a first vertical height and having a first side, an opposing side, a first end and an opposing end. According to at least one embodiment, the base element couples with a roofing batten and elevates the roofing batten. The roofing batten may comprise an elongated portion of material having a top surface, a bottom surface and a portion therebetween of a second vertical height, such that the material couples with a roofing material. In at least one embodiment, the base element elevates the roofing batten from a roof by the first vertical height. This enables the roofing material to be offset from the roof by a sum of the first and second vertical heights.

7 Claims, 4 Drawing Sheets

(56) References Cited

U.S. PATENT DOCUMENTS

| | | | |
|---|---|---|---|
| 6,511,127 B2* | 1/2003 | Wilkens | 297/270.5 |
| 6,536,171 B1 | 3/2003 | Vandewater | |
| 6,536,175 B2* | 3/2003 | Conterno | 52/489.1 |
| 6,718,719 B1 | 4/2004 | Hagerty | |
| 7,386,962 B2 | 6/2008 | Estes et al. | |
| 7,441,379 B2* | 10/2008 | Konstantin | 52/200 |
| 7,546,708 B2* | 6/2009 | Konstantin | 52/200 |
| 7,765,760 B2* | 8/2010 | Konstantin | 52/466 |
| 7,877,957 B2 | 2/2011 | Vandewater | |
| 7,926,236 B2* | 4/2011 | Konstantin | 52/466 |
| 8,584,424 B2* | 11/2013 | Smith et al. | 52/588.1 |
| 8,662,455 B2* | 3/2014 | Hernandez et al. | 248/73 |
| 8,851,430 B2* | 10/2014 | Mulzer | 248/74.2 |
| 2003/0233800 A1 | 12/2003 | Vandewater | |
| 2007/0113508 A1* | 5/2007 | Hay et al. | 52/551 |
| 2010/0242397 A1* | 9/2010 | Givoni et al. | 52/588.1 |
| 2012/0005979 A1 | 1/2012 | Carranza | |
| 2012/0025034 A1* | 2/2012 | Turner | 248/65 |
| 2012/0151867 A1* | 6/2012 | Smith et al. | 52/588.1 |

* cited by examiner

ROOFING BATTEN SNAP SPACER

BACKGROUND OF THE INVENTION

1. Field of the Invention

One or more embodiments of the invention are related to roofing batten risers, specifically roofing batten risers that couple with roofing battens to provide space between the battens and the roof deck. More particularly, but not by way of limitation, one or more embodiments of the invention describe a roofing batten snap spacer with a base element that includes one or more coupling elements that non-permanently couple the snap spacer to roofing battens using a sliding attachment, a wrapping attachment, snap on attachment or any combination thereof.

2. Description of the Related Art

Generally, roofing battens are strips of a material, usually wood, that attach to a roof deck before installation of roof tile. Roof tiles are generally nailed into each batten strip to secure the roof tile to the roof. Typically, with steep roof angles, the roofing batten strips assist a roofer when placing roof tiles on the roof while preventing the tile from falling off the roof during installation. Initially, batten strips were traditionally provided as 1"×2"×8" pieces of wood that attach horizontally to a roof deck and roof tiles and nailed therein. Shortcomings of such a design were discovered, as the wooden batten strips would usually rot for example due to wind driven rainwater and melting snow under the roofing tiles. In addition, it was found that most often the wooden batten strips would act as a dam, causing water to pond and collect under the roofing tiles leading to a rotted out wooden batten and tiles slipping off the roof. In solving the above drawback, several ideas have been proposed.

For example, U.S. Pat. No. 6,718,719 to Hagerty et al., entitled "Batten Strip For Roof Tiles", discloses wooden battens that were manufactured with notches cut into the wooden battens to allow the collected rainwater to flow through the batten. The apparatus of Hagety et al., however, appears to remain in contact with water, and does not solve the issues at hand.

U.S. Pat. No. 6,357,193 to Morris, entitled "Roof Batten", discloses a roof batten made entirely out of a plastic material and making the batten "honeycomb" in order for the water to flow through the batten and prevent rotting or decay. Even though the device of Morris is lighter in weight, it is more expensive.

U.S. Pat. No. 6,536,171 to Vandewater, entitled "Elevated Batten System", discloses a batten system with an elevated batten by attaching small shims of wood under the batten in order to raise the batten off the roof deck. This allows the water to flow beneath the entire batten. The apparatus of Vendewater, however, appears to rot out the wooden shims, not solving the issue at hand.

U.S. Pat. No. 7,877,957 to Vandewater Jr., entitled "Method Of Installing An Improved Elevated Batten System", discloses an improved version of the Vendewater reference above, using a plastic puck attachment to couple to the underside of the wooden batten. The apparatus of Vendewater Jr. however is a cumbersome assembly, as it is required to be purchased as a complete assembly with battens and risers fixedly attached.

U.S. Pat. No. 7,386,962 to Estes et al., entitled "Batten Riser Assembly", discloses an assembly that allows a roofer to purchase a separate plastic "riser" attached to a plastic strip or string. With such a configuration, the roofer stretches the plastic strip with the riser across the roof, then places a wooden batten above the plastic strip and riser. The apparatus of Estes et al., however, appears to involve drawbacks as stretching the plastic strip with the riser on it across the roof is dangerous due to tripping issues, and laborious due to the various steps needed to securely attach the battens to the roof.

Traditionally, batten strips and batten strip risers are not equipped and structured with a loose element that is safe, quick and user friendly. Furthermore, traditional risers are not implemented as non-permanently attached risers that wrap around and/or snap onto a wooden batten without the need of pucks, plastic strips or a high weight. In addition, traditional assemblies require a user to purchase the wooden batten strips along with the risers or pucks (or any other traditionally and previously used elements) as an assembly. There are no known devices that allow for low-cost a "do-it-yourself" system wherein a user is able to purchase a snap spacer separately in large lightweight quantities, while purchasing wooden strips separately as desired.

In summary, there are no known roofing batten risers that are provided as separate loose components allowing a user the flexibility to assemble the elements as desired. In addition, for at least the limitations described above, there are no known risers that non-permanently attached or otherwise wrap around and/or snap onto a wooden batten, eliminating any additional cumbersome components needed to safely secure the wooden battens to a roof. For at least the limitations described above there is a need for a roofing batten snap spacer that solves the problems with the known devices.

BRIEF SUMMARY OF THE INVENTION

One or more embodiments described in the specification are related to roofing batten snap spacers that elevate a roofing batten from a roof. In one or more embodiments, the roofing batten snap spacer includes a base element having a first vertical height and having a first side, an opposing side, a first end and an opposing end. According to at least one embodiment, the base element couples with a roofing batten and elevates the roofing batten. The roofing batten may comprise an elongated portion of material having a top surface, a bottom surface and a portion therebetween of a second vertical height, such that the material couples with a roofing material. In at least one embodiment, the base element elevates the roofing batten from a roof by the first vertical height. This enables the roofing material to be offset from the roof by a sum of the first and second vertical heights.

According to one or more embodiments, the base element may be one of several different shapes such as rectangular or square. In one or more embodiments of the invention, the base element is not rectangular or not squared. As such, the base element may be of any suitable shape that is able to attach to a wooden batten strip securely. In at least one embodiment of the invention, the base element is hollow.

By way of one or more embodiments, the first vertical height of the base element is greater than zero inches, greater than one quarter of an inch or greater than three-eighths of an inch or any other dimension that provides adequate space between the roofing batten and roof deck. As one of ordinary skill in the art will recognize, other measurements and dimensions may be utilized in keeping with the spirit of the invention in providing a non-permanent or at least constructive roofing batten snap spacer.

According to at least one embodiment of the invention, the base element includes at least one coupling element to non-permanently couple with the roofing batten. In one or more embodiments, the at least one coupling element may couple with the roofing batten by way of one or more of sliding on, wrapping around and snapping on to the roofing batten. In at least on embodiment, the at least one coupling element includes at least two coupling elements with L-shaped legs on the first side and opposing side thereof of the base element. In at least one embodiment of the invention, the L-shaped legs are provided on the first end and the opposing end thereof of the base element.

According to one or more embodiments, the L-shaped legs extend orthogonal to the base element and each of the L-shaped legs includes a longitudinal strip and an extension orthogonal to the longitudinal strip. As such, according to at least one embodiment of the invention, the base element is able to lay flat on the top surface of the roofing batten, and each of L-shaped legs are able to wrap around and snap on to said roofing batten. With such a configuration, in at least on embodiment, each of longitudinal strips lay flat on the portion with the second vertical height of the roofing batten and each of the extensions of the L-shaped leg lay flat on the bottom surface of the roofing batten. It is noted however, that the L-shaped legs, in addition to or alternatively, are able to slidingly couple to the roofing batten.

By way of one or more embodiments, the snap spacer and base element may be further attached to the roofing battens, for example snapped and an positioned horizontally along the batten as desired, wherein the batten is the attached to the roof deck using one or more fastening mechanisms such as nails, screws, bolts, nuts, pins, nuts, anchors, threaded elements, sockets, anchors, retaining rings, retaining clips, set screws, washers or any combination thereof

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A roofing batten snap spacer will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
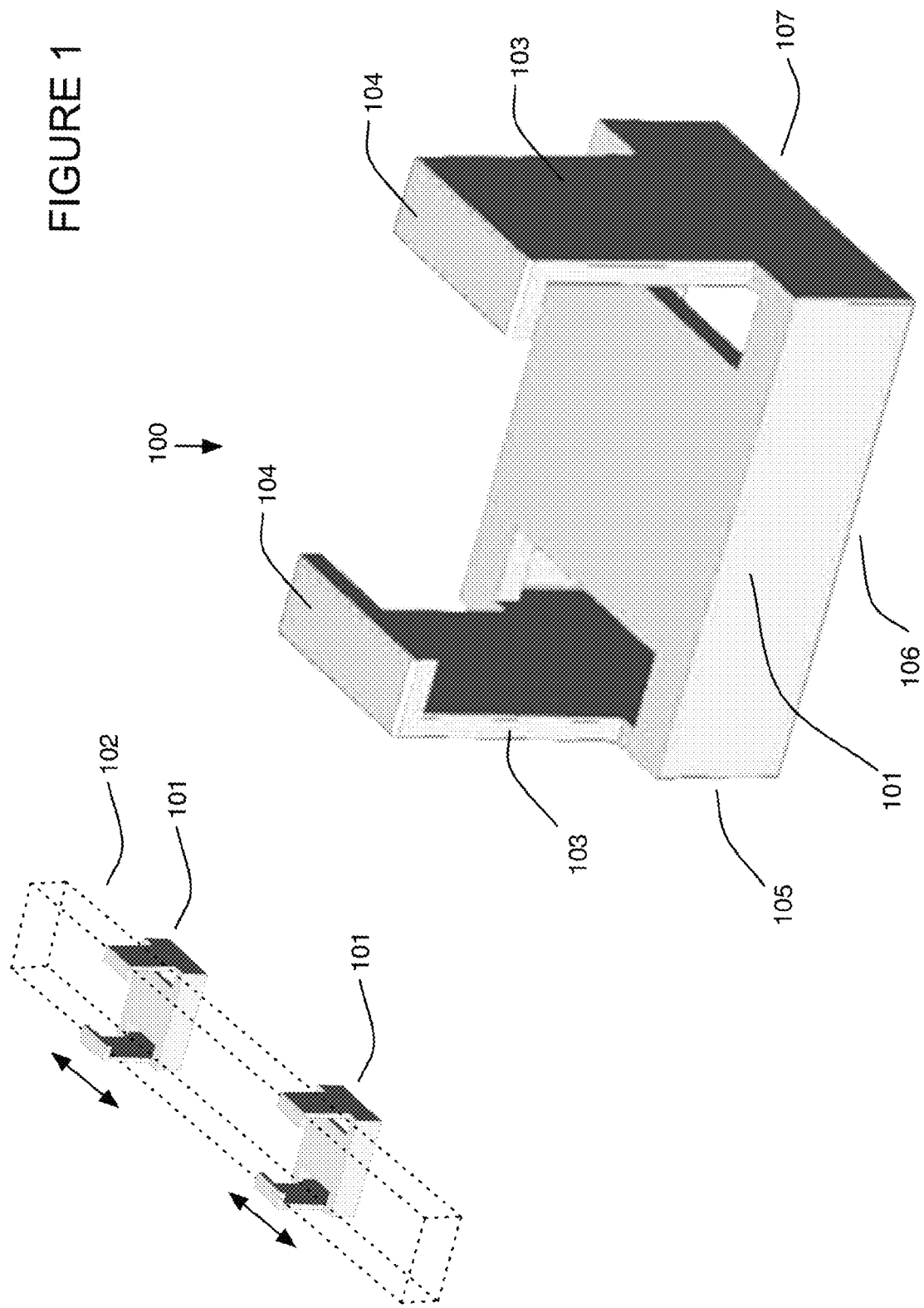
FIG. 1 shows a schematic overall diagram of the roofing batten snap spacer according to one or more embodiments of the invention.

FIG. 1 shows a schematic overall diagram of the roofing batten snap spacer according to one or more embodiments of the invention. As shown in FIG. 1, one or more embodiments described in the specification are related to roofing batten snap spacers 100 that elevate a roofing batten 102 from a roof. The base elements 101 are securely coupled to the roofing batten for example in the vertical direction and are configured to snap onto the roofing batten from the side or slide across the roofing batten 102 depicted using the double-sided arrows. In one or more embodiments, the roofing batten snap spacer 100 includes the base element 101 and coupling elements 103 with a coupling element extensions 104. In at least one embodiment, the base element 101 has a first vertical height 105, a first end 106, an opposing end (not numbered) to the first end 106, a first side 107 and an opposing side to the first side 107 (not numbered). According to at least one embodiment, the base element 101 couples with the roofing batten 102 and elevates the roofing batten 102. The roofing batten 102 may comprise an elongated portion of material having a top surface, a bottom surface and a portion therebetween of a second vertical height, such that the material couples with a roofing material. In at least one embodiment, the base element 101 elevates the roofing batten 102 from a roof by the first vertical height 105. This enables the roofing material to be offset from the roof by a sum of the first and second vertical heights. As also depicted in FIG. 1, and in at least one embodiment of the invention, the base element 101 is hollow.

In at least one or more embodiments of the invention, roofing batten snap spacers 100 are loose components non-permanently attached to the roofing battens 102. In one or more embodiments, at least one of base element 101 and coupling elements 103 are flexible. In addition, according to at least one embodiment of the invention, the roofing batten snap spacers 100 could be entirely or partially contain a material selected from plastic, concrete, latex, stone, clay, ceramic, rubber, silicone, epoxy or any combination thereof. As one of ordinary skill in the art would appreciate, other materials could be utilized in keeping with the spirit of the invention.

Figure 2:
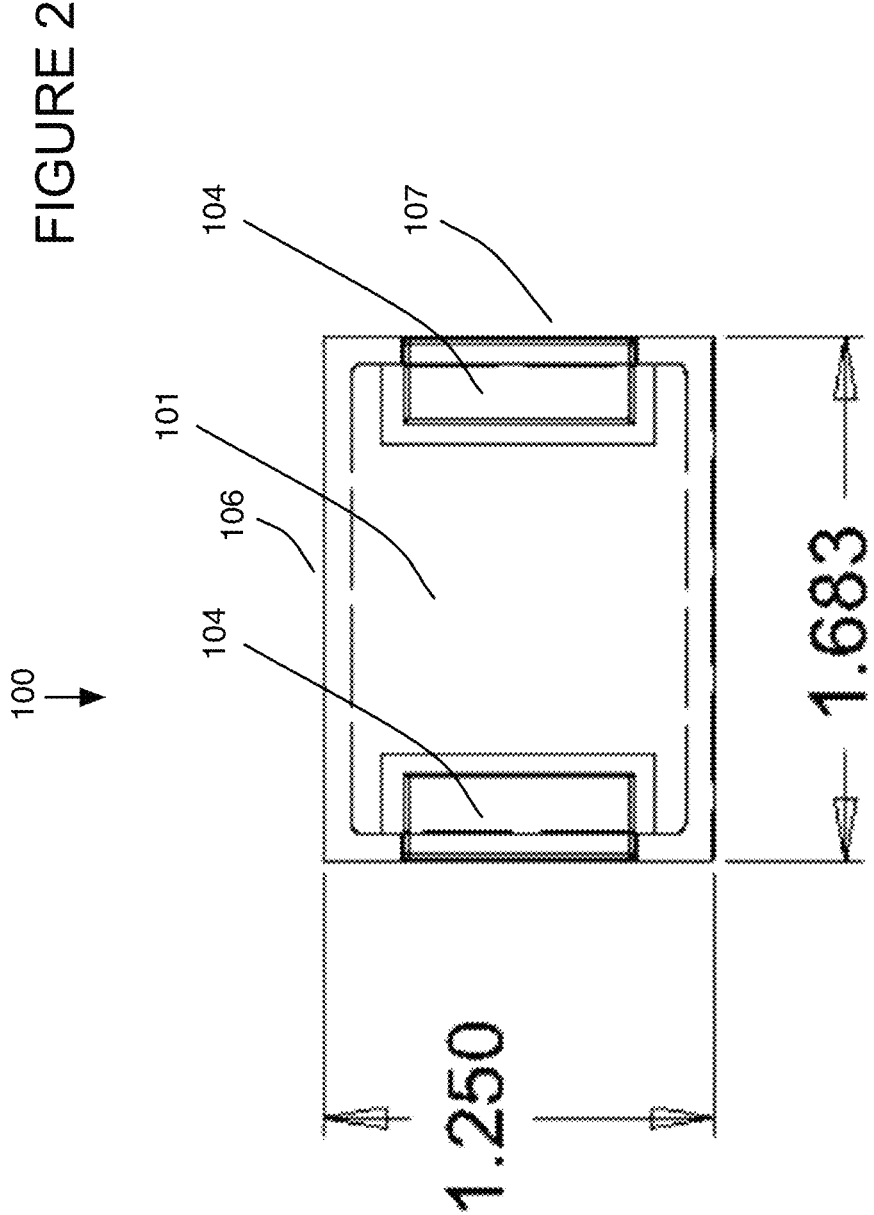
FIG. 2 shows a top view of the roofing batten snap spacer according to one or more embodiments of the invention.
Figure 3:
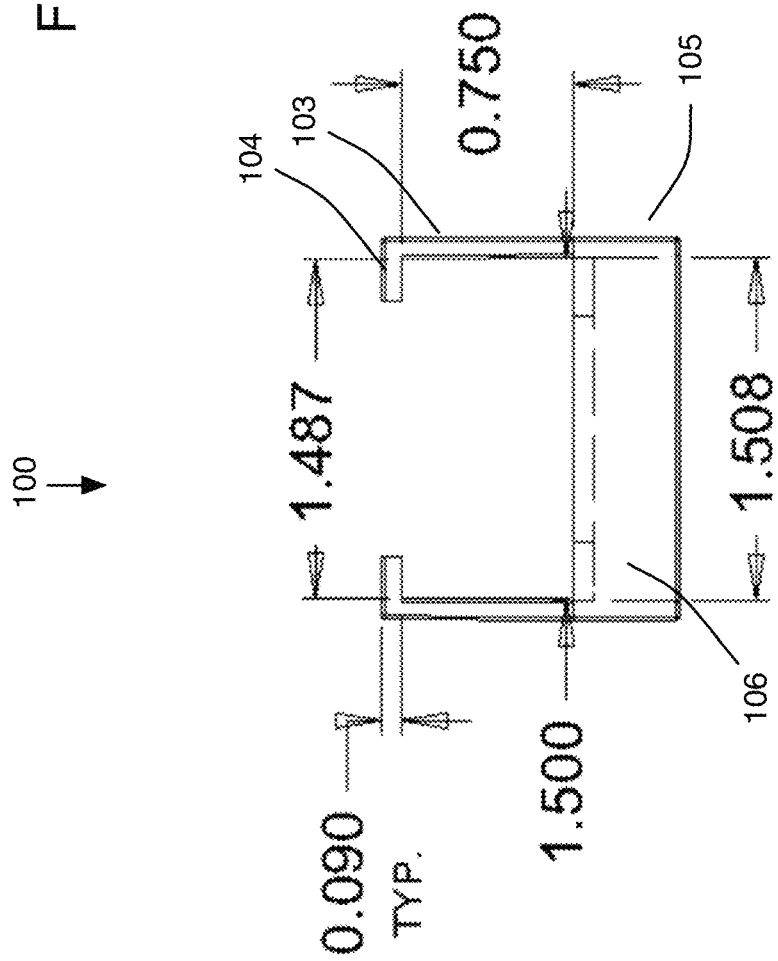
FIG. 3 shows a front view of the roofing batten snap spacer according to one or more embodiments of the invention.
Figure 4:
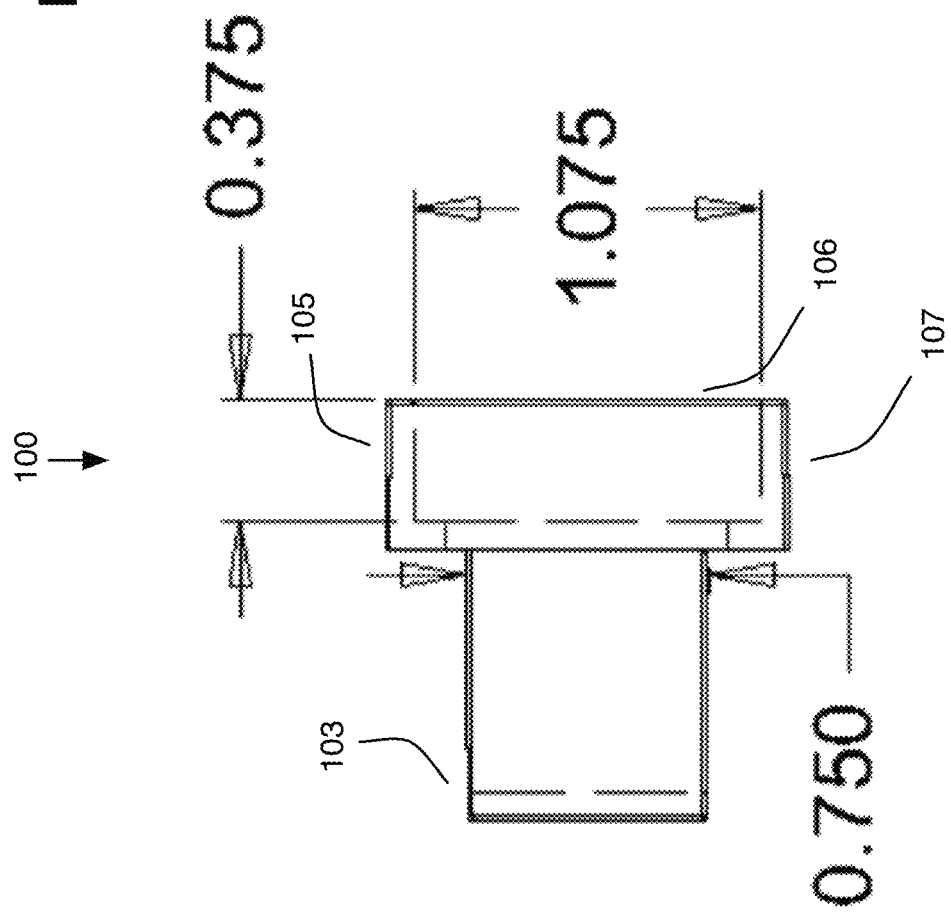
FIG. 4 shows a side view of the roofing batten snap spacer according to one or more embodiments of the invention.

FIGS. 2-4 illustrate specific shapes and measurements for the roofing batten snap spacers 100. It is noted that the measurements and shapes are exemplary and other measurements and shapes, as one of ordinary skill in the art would appreciate, are in keeping with the spirit of the invention.

FIG. 2 shows a top view of the roofing batten snap spacer according to one or more embodiments of the invention. As shown in FIG. 2, as one example, base element 101 is shown as rectangular with a first end 106 and opposing end of 1.683 inches, and a first side 107 and an opposing side of 1.250 inches. According to at least one embodiment of the invention, the base element 101 includes the at least one coupling element 103 to non-permanently couple with the roofing batten 102. In one or more embodiments, the at least one coupling element 103 coupled with the roofing batten 102 by way of one or more of sliding on, wrapping around and snapping on to the roofing batten 102 as also shown in FIG. 1. In at least on embodiment, for example, the at least one coupling element 103 includes at least two coupling elements with L-shaped legs on the first side 107 and opposing side thereof of the base element 101. In at least one embodiment of the invention, the L-shaped legs are provided on the first end 106 and the opposing end thereof of the base element. According to one or more embodiments, coupling elements 103 could be provided on any portion, surface or side of the apparatus, in addition to any number of coupling elements greater than one.

As illustrated in FIGS. 2 and 3, extensions 104, shown, may point in a direction parallel to base element 101, such that each of the coupling element extensions 104 point towards one another. According to one or more embodiments, coupling elements 103 and/or coupling element extensions 104 may be angled at less than or greater than 90 degrees, and could be structured in a non-axial manner.

FIG. 3 shows a front view of the roofing batten snap spacer according to one or more embodiments of the invention.

According to one or more embodiments, coupling elements 103 are L-shaped legs that extend orthogonal to the base element 101. As illustrated in FIG. 3, each of the L-shaped legs 103 includes a longitudinal strip and an extension 104 orthogonal to the longitudinal strip. As such, according to at least one embodiment of the invention, the base element 101 is able to lay flat on the top surface of the roofing batten 102, and each of L-shaped legs 103 are able to wrap around and snap on to said roofing batten. With such a configuration, in at least on embodiment, each of longitudinal strips lay flat on the portion with the second vertical height of the roofing batten 102 and each of the extensions 104 of the L-shaped leg lay flat on the bottom surface of the roofing batten 102. Such a configuration is depicted in FIG. 1. It is noted however, that the L-shaped legs, in addition to or alternatively, are able to slidingly couple to the roofing batten, such that the location of each of the one or more roofing batten snap spacers 100 may be altered as needed by shifting the roofing batten snap spacers 100 across the roofing batten 102.

FIG. 3 illustrates exemplary measurements for roofing batten snap spacer 100. By way of one or more embodiments, the first vertical height of the base element is greater than zero inches, greater than one quarter of an inch or greater than three-eighths of an inch or any other dimension that provides adequate space between the roofing batten and roof deck. As shown in FIG. 3, a length of the first end 106 is 1.508 inches, the longitudinal strips of coupling element 103 are 0.750 inches and extensions 104 have a thickness of 0.090 inches. In addition, as shown in FIG. 3, the distance from an inner surface of a first longitudinal strip on the first side 107 (not shown) to an inner surface of the opposing side's longitudinal strip is 1.487 inches, and the distance from an outer surface of a first longitudinal strip on the first side 107 (not shown) to an outer surface of the opposing side's longitudinal strip is 1.500 inches. As one of ordinary skill in the art will recognize, other measurements and dimensions may be utilized in keeping with the spirit of the invention in providing a non-permanent or at least constructive roofing batten snap spacer.

According to one or more embodiments of the invention, coupling elements 103 are on the same vertical axis as the first vertical height 105 not exceeding the length of the first end 106 or the first side 107 (as shown in FIGS. 1 and 2). According to one or more embodiments of the invention, coupling elements could exceed the length of one or more of the first end 106, the opposing end, the first side 107 or the opposing side, such that one or more of the coupling elements 103 protrude past the lengths of the first end 106, opposing end, the first side 107, or the opposing side. According to one or more embodiments of the invention, coupling elements could be less than the length of one or more of the first end 106, the opposing end, the first side 107 or the opposing side, such that one or more of the coupling elements 103 are located closer to one another on the inside of base element 101 away from the first end 106, opposing end, the first side 107, or the opposing side (as shown in FIG. 4). With such configurations, according to FIG. 3, for example, at least one of coupling elements 103 may exceed or be less than 1.508 inches, rending the roofing batten snap spacer 100 to have a total length greater or less than 1.508 inches, respectively. As one of ordinary skill in the art will recognize, other measurements are similarly applicable in keeping with the spirit of the invention.

FIG. 4 shows a side view of the roofing batten snap spacer according to one or more embodiments of the invention. According to FIG. 4, as one example of measurements, a length of the first side 106 is 1.075 inches and the first vertical height is 0.375 inches. As discussed above regarding FIG. 3, FIG. 4 illustrates coupling element 103 with a base length parallel to base element 101 of 0.750 inches. As discussed above, in at least one embodiment of the invention, one or more of coupling elements 103 could be on the same axis as the first end 106, the opposing end, the first side 107 or the opposing side, or one or more of coupling elements 103 could be off-axis relative to the first end 106, the opposing end, the first side 107 or the opposing side, or any combination thereof.

By way of one or more embodiments as described above, the snap spacer 100 and base element 101 may be further attached to the roofing battens 102, for example snapped and an positioned horizontally along the batten as desired, wherein the batten is the attached to the roof deck using one or more fastening mechanisms such as nails, screws, bolts, nuts, pins, nuts, anchors, threaded elements, sockets, anchors, retaining rings, retaining clips, set screws, washers or any combination thereof.

As shown in FIGS. 2-4 and according to one or more embodiments, the base element 101 may be one of several different shapes such as rectangular or square. In one or more embodiments of the invention, the base element 101 is not rectangular or not squared. As such, the base element 101 may be of any suitable shape that is able to attach to a wooden batten strip securely and non-permanently.

While the invention herein disclosed has been described by means of specific embodiments and applications thereof, numerous modifications and variations could be made thereto by those skilled in the art without departing from the scope of the invention set forth in the claims.

What is claimed is:

1. A roofing batten snap spacer system configured to elevate a roofing batten from a roof comprising:
a flexible base element having a first vertical height and having
a first side,
an opposing side,
a first end and an opposing end,
a roofing batten, wherein said roofing batten comprise an elongated portion of material having a top surface, a bottom surface and a portion therebetween of a second vertical height, wherein said material is configured to couple with a roofing material;
wherein said flexible base element is configured to
couple with said roofing batten, and
elevate said roofing batten from a roof by said first vertical height, such that said roofing material is offset from said roof by a sum of said first and second vertical heights;
wherein said flexible base element comprises a base element bottom surface configured to couple to said roofing batten;
wherein said flexible base element is hollow at said base element bottom surface and further comprises a hollow portion on said base element bottom surface, such that said flexible base element is configured to couple with said top surface of said roofing batten at said hollow portion;
wherein said flexible base element further comprises two coupling elements comprising L-shaped legs on said first side and said opposing side extending orthogonal to said flexible base element configured to loosely or non-permanently couple with said roofing batten, such that each of said L-shaped legs comprise a longitudinal strip and an extension orthogonal to said longitudinal strip; and
wherein said flexible base element is further configured to lay flat on said top surface and each of L-shaped legs are configured to wrap around and snap on said roofing batten, such that said each of longitudinal strips lay flat on said portion with said second vertical height and each of said extensions lay flat on said bottom surface.

2. The roofing batten snap spacer according to claim 1, wherein said flexible base element is rectangular or square.

3. The roofing batten snap spacer according to claim 1, wherein said flexible base element is not rectangular.

4. The roofing batten snap spacer according to claim 1, wherein said first vertical height is greater than zero inches.

5. The roofing batten snap spacer according to claim 1, wherein said first vertical height is greater than one quarter of an inch.

6. The roofing batten snap spacer according to claim 1, wherein said first vertical height is greater than three-eighths of an inch.

7. The roofing batten snap spacer according to claim 1, wherein said two coupling elements are further configured to slidingly couple with said roofing batten.

\* \* \* \* \*